April 3, 1934.   A. LIMA, JR   1,953,653
METHOD OF TREATING SUGAR CONTAINING LIQUIDS
Filed May 19, 1930
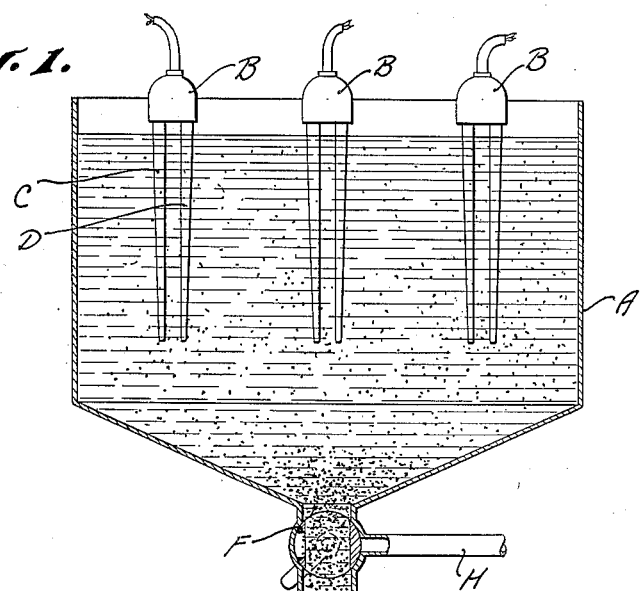
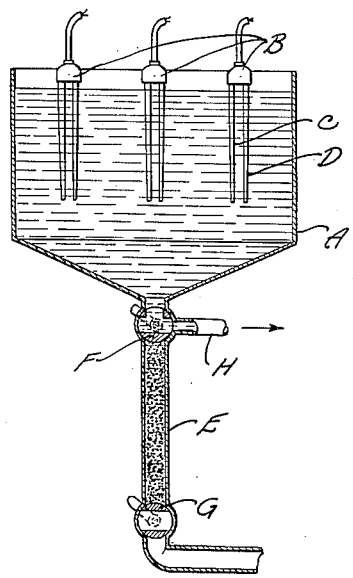
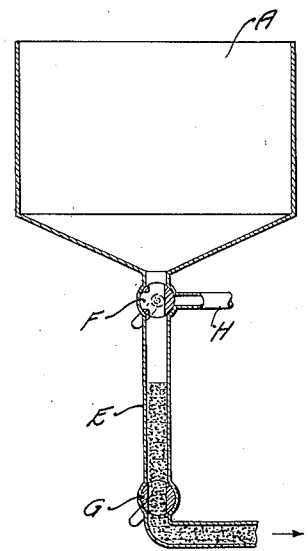
INVENTOR:
Alfred Lima Jr.,
BY R. S. Berry
ATTORNEY.

Patented Apr. 3, 1934

1,953,653

UNITED STATES PATENT OFFICE 1,953,653

METHOD OF TREATING SUGAR CONTAINING LIQUIDS

Alfred Lima, Jr., Los Angeles, Calif.

Application May 19, 1930, Serial No. 453,529

3 Claims. (Cl. 204—24)

This invention relates to a method of treating sugar containing liquid.

An object of the invention is to provide a method for purifying and clarifying sugar containing liquids whereby the removal of impurities from the liquid and decoloration thereof may be rapidly and economically effected.

Another object is to provide a method whereby sugar containing liquid may be purified without the use of objectionable temperatures and whereby the formation of inverted sugars, or the conversion of sucrose into dextrose and levulose, is prevented.

Another object is to provide a method for treating sugar containing liquid which will facilitate and increase the production of white sugar therefrom.

A further object is to provide a method of treating saccharine liquids by electrolysis to effect decolorization thereof and the removal of impurities therefrom in a single operation, that is without previous or subsequent filtration of the liquid, and in such manner as to prevent fouling of the electrodes used in performing the electrolytic action by the collection of gums and other impurities on the electrodes.

In attaining the foregoing objects, together with such other objects and advantages as may subsequently appear, the steps and features hereinafter described and illustrated in the accompanying drawing are employed.

Referring to the drawing Figs. 1, 2, and 3 are diagrams in section of an apparatus adapted to be employed in carrying the invention into effect; Fig. 1, showing an initial step of the method; Fig. 2 depicting an intermediate step, and Fig. 3 showing a final step.

As illustrated in the drawing, a suitable volume of sugar containing liquid to be treated, such as raw sugar liquor, sugar juices, sugar solutions, and the like, is placed in a receptacle A and is subjected to an electrolytic action by means of a plurality of electrodes B.

An important feature of the invention resides in incorporating in the liquid, a quantity of pulverulent or finely comminuted animal charcoal generally known as bone black, which charcoal may be used in various quantities in proportion to the volume of liquid according to varying characteristics of the liquid, but which in most instances is employed in the proportion of approximately five per cent by volume. The liquid and charcoal are placed in the receptacle thoroughly intermixed and at atmospheric temperature. The charcoal is insoluble in the liquid, and is accordingly held in suspension therein.

One or more sets of electrodes are submerged in the liquid with the anode and cathode members C and D thereof depending therein, and are placed in operation by directing an electrical current therethrough in the manner common in effecting electrolytic action.

In carrying out the invention, the electrodes are formed of aluminum or aluminum alloy in order to effect a chemical combination between the aluminum of the electrodes and the salts and free acids contained in the liquid whereby carbon dioxide is formed.

The electrodes are placed in operation before the charcoal particles have opportunity to precipitate and preferably before any appreciable precipitation of the charcoal particles occurs, and are maintained in operation to effect an electrolytic action on the liquid for a sufficient period of time to attain the chemical reaction necessary to cause separation of impurities from the liquid in flocculent form and cause the chlorophyll of the liquid to enter into combination with the carbon of the animal charcoal and with the carbon dioxide thereby separating it from the sucrose and water content of the liquid and leaving the solution colorless. The duration of the electrolytic action is varied according to the volume of the liquid under treatment, the character of the liquid, the character of the electrodes and the electrical current employed, but in practice it is found that in most instances an electrolytic action of approximately 45 minutes is sufficient to accomplish the desired results. It is desirable that the liquid be maintained at a temperature of less than 100 degrees centigrade and accordingly the electrodes are so designed and arranged, and the electrical current so regulated as to avoid over-heating of the liquid.

During the electrolytic action, the carbon dioxide in the form of minute bubbles, form adjacent the electrodes, rise to the surface of the liquid and escape to atmosphere, and by reason of the liquid adjacent the electrodes being heated and thereby caused to flow upwardly a thermal action is set up in the volume of liquid in the reservoir in such manner as to maintain the liquid in a state of slow agitation and circulation whereby the entire liquid content of the reservoir is subjected to the electrolytic action in a short time. This agitation and circulation of the liquid is sufficient to accomplish the desired result without employment of any other agitating means. The carbon acts to absorb gums, pectins, and other solid organic matter and to hold such impurities in suspension in the liquid and thereby prevent the collection of such impurities on the electrodes. Furthermore, a portion of the particles of carbon are caused to flow upwardly with the liquid adjacent the electrodes and to contact the latter so as to effect a scouring action thereon and thereby further prevent the collection of impurities and the formation of scale on the electrodes, thereby stimulating or hastening the electrolytic action by reason of the electrodes being kept clean. Impurities in solution in the liquid do not become absorbed by the carbon only to a small extent, and it is such impurities that are subject to the electrolytic action. During the electrolytic action, the impurities of the liquid separate therefrom in most part in flocculent form and are caused to be rapidly precipitated by and with the charcoal particles which gravitate to the bottom of the receptacle; portions of the salts and free acids however being removed with carbon dioxide as before described.

During the foregoing treatment of the liquid, the charcoal particles settle into a trap E as shown in Fig. 1; the upper portion of the trap opening to the receptacle through a valve F and the lower portion of the trap being closed by the valve G.

When the desired purifying and clarifying of the liquid has been effected and the mass of charcoal and impurities have been collected in the trap E as shown in Fig. 2, the valve F is positioned to close the trap to the reservoir and to effect communication between the reservoir and a drawoff pipe H, whereby the clarified liquid is drawn off and separated from the precipitated impurities. After thus removing the liquid, the valve F is positioned to close the drawoff pipe and opening communication between the reservoir and the trap as shown in Fig. 3, and the valve G is turned to open the lower end of the trap to discharge, whereupon the impurities and charcoal are flushed from the trap and the valve G then closed. The apparatus is then conditioned for treatment of another charge.

It has been found that by this process, inversion of the sugar, or the breaking up of the sucross into dextrose and levulose is prevented by the combination of the free acids, which are removed as before described. It will now be seen that by the combined action of the carbon particles and electrolysis the impurities in solution as well as those in suspension in the juice will be separated therefrom, thus effecting purification and decolorization of the juice in one treatment thereof and without the aid of filtration either before or subsequent to treatment of the juice.

I claim:

1. The method of treating a sugar containing liquid consisting in subjecting the liquid while in a quiescent state to an electrolytic action by directing an electric current through the liquid to and from aluminum electrodes to set up circulation of the liquid and effect chemical combination of the aluminum of the electrodes with salt and acid content of the liquid in the presence of comminuted animal carbon held in suspension in the liquid.

2. The method of treating a sugar containing liquid, consisting in intermixing a quantity of pulverulent animal charcoal with the liquid and subjecting the mixture while in a quiescent state to an electrolytic action while the charcoal is in suspension therein such as to cause circulation of the liquid, then allowing the charcoal and resultant associated impurities to settle into a mass, and finally separating the resultant purified and decolorized liquid and mass.

3. The method of treating a sugar containing liquid to remove impurities therefrom and to effect decolorization thereof; consisting in intermixing with the liquid a quantity of comminuted animal charcoal in the proportion by volume of approximately five per cent of the quantity of liquid to be treated, subjecting the liquid while in a quiescent state to an electrolytic action while the charcoal is held in suspension in the liquid by directing an electric current through the liquid to and from electrodes to set up circulation of the liquid, then effecting separation of the treated liquid and the charcoal together with resultant impurities associated with the latter.

ALFRED LIMA, Jr.